(12) United States Patent
Fralin et al.

(10) Patent No.: US 12,070,712 B2
(45) Date of Patent: Aug. 27, 2024

(54) COLLAPSIBLE AIR FILTER ASSEMBLIES

(71) Applicant: FILTEREASY, LLC, Raleigh, NC (US)

(72) Inventors: Joey Fralin, Raleigh, NC (US); Fredrik Perman, Raleigh, NC (US); Jeffrey Silver Taggart, Raleigh, NC (US); Kevin James Barry, Raleigh, NC (US); Aly Khalifa, Raleigh, NC (US); Thaddeus Worth Tarkington, Raleigh, NC (US)

(73) Assignee: FILTEREASY, LLC, Raleigh, NC (US)

( * ) Notice: Subject to any disclaimer, the term of this patent is extended or adjusted under 35 U.S.C. 154(b) by 428 days.

(21) Appl. No.: 17/497,468

(22) Filed: Oct. 8, 2021

(65) Prior Publication Data

US 2022/0023791 A1    Jan. 27, 2022

Related U.S. Application Data

(63) Continuation of application No. PCT/US2020/027476, filed on Apr. 9, 2020.
(Continued)

(51) Int. Cl.
*B01D 46/10* (2006.01)
*B01D 46/00* (2022.01)
*B01D 46/52* (2006.01)

(52) U.S. Cl.
CPC ......... *B01D 46/10* (2013.01); *B01D 46/0016* (2013.01); *B01D 46/521* (2013.01); *B01D 2275/203* (2013.01)

(58) Field of Classification Search
None
See application file for complete search history.

(56) References Cited

U.S. PATENT DOCUMENTS 10,245,542 B2 * 4/2019 Knuckles ........... B01D 46/0016
2001/0020512 A1 * 9/2001 Heilmann ............. B01D 46/10
156/205
(Continued)

FOREIGN PATENT DOCUMENTS

EP    3863750 A1    8/2021

OTHER PUBLICATIONS

EPO; Extended European Search Report for European Patent Application No. 20787129.4 dated Dec. 2, 2022, 8 pages.
(Continued)

*Primary Examiner* — Jason M Greene
(74) *Attorney, Agent, or Firm* — NK Patent Law

(57) ABSTRACT

A collapsible air filter assembly for a heating and ventilation air conditioner (HVAC) system includes a filter element, and a frame supporting the filter element. The frame includes at least two edges each including a respective spring element configured to be moveable between an open state and a bent state. A compressible air filter assembly for an (HVAC) system includes a filter medium having rounded pleats configured to collapse and rebound in a controlled and repeatable manner between a compressed state and an original uncompressed state. A soft-wrapped filter assembly includes a frame in a box configuration. The frame includes rigid edges and openings to permit airflow. A filter element is encased by the frame. Flexible edge covers mounted on respective edges of the frame to provide an air seal in an HVAC system.

17 Claims, 17 Drawing Sheets

Related U.S. Application Data

(60) Provisional application No. 62/831,263, filed on Apr. 9, 2019.

(56) References Cited

U.S. PATENT DOCUMENTS

| | | |
|---|---|---|
| 2009/0019824 A1* | 1/2009 | Lawrence .............. B01D 46/10 55/497 |
| 2011/0126500 A1 | 6/2011 | Whittemore |
| 2017/0151526 A1 | 6/2017 | Cole |
| 2017/0216756 A1 | 8/2017 | Fox et al. |
| 2017/0216757 A1 | 8/2017 | Ouyang et al. |
| 2018/0021716 A1 | 1/2018 | Li et al. |
| 2018/0178153 A1* | 6/2018 | Driss .................... B01D 46/521 |

OTHER PUBLICATIONS

ISA/KR, International Search Report and Written Opinion for corresponding PCT Patent Application No. PCT/US2020/027476, mailed Jul. 17, 2020, 11 pages.
WIPO, International Preliminary Report on Patentability for corresponding PCT Patent Application No. PCT/US2020/027476, dated Sep. 28, 2021, 8 pages.
EPO, Office Action for corresponding European Patent Application No. 20787129.4, dated Feb. 5, 2024, 4 pages.

* cited by examiner

COLLAPSIBLE AIR FILTER ASSEMBLIES

CROSS-REFERENCE TO RELATED APPLICATION

This application is a continuation of International Patent Application No. PCT/US2020/027476, titled "COLLAPSIBLE AIR FILTER ASSEMBLIES", filed on Apr. 9, 2020, which claims the benefit of priority of U.S. provisional patent application No. 62/831,263, titled "COLLAPSIBLE AIR FILTER ASSEMBLIES", filed on Apr. 9, 2019, which are incorporated herein in their entireties by this reference.

TECHNICAL FIELD

The present disclosure relates to devices for air filtration. More particularly, the present disclosure relates to collapsible air filter assemblies.

BACKGROUND

Air filters for capturing dust, particulate matter, and other airborne materials such as animal hair and dander are available in varieties of sizes that are typically purchased and stored in the same dimensions as when they are installed. Most residential air filters are rectangular box-shapes, such as 8×16×1 inches or 20×20×2 inches. Typical home or business heating and ventilation air conditioner (HVAC) air-handling systems require periodic or occasional replacement of a particularly dimensioned filter, and consumers are burdened with finding a replacement air filter.

As the popularity of shipping air filters directly to consumers has increased, the importance of reducing the amount of space air filters require during shipping or storage has also increased. Because the structure of typical air filters includes cardboard or plastic which is not designed to be collapsible, attempting to fold or otherwise collapse a traditional air filter would result in damage to the air filter. This damage may affect the seal between the air filter and the HVAC system into which the filter is installed and may result in degraded performance of the filter, as well as compromise the structural integrity permitting the filter to be pulled into the system. Additionally, many traditional air filters include cross-sectional V-shaped patterns of folded fibrous material within the filter frame for capturing particulate matter. If compressed, these shapes may be permanently deformed, leaving little to no air gaps between the material even after the compacting load has been removed. One consequence is a reduction in effective surface area or air flow characteristics of the filter. This type of compaction or compression may damage the performance of a filter even if it has not been otherwise folded or collapsed.

Therefore, a need exists for a collapsible and compressible air filter that can be stored for long periods of time (e.g., years) yet also be capable of quickly and easily returning to its original shape for installation without suffering from damage, deformation, or otherwise degraded performance as a result of being collapsed for a period of time.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

In at least one embodiment, a collapsible air filter assembly for a heating and ventilation air conditioner (HVAC) system includes a filter element, and a frame engaging and supporting the filter element. The frame includes at least two edges, each edge including a respective spring element. Each spring element is configured to be moveable between an open state and a bent state, and wherein the frame is positioned within an HVAC return to secure the filter element within an airflow of the HVAC system.

The at least two edges of the frame each including a respective spring element may be adjacent frame edges.

The at least two edges of the frame each including a respective spring element may be opposite frame edges.

Each spring element may be configured to bias a respective edge of the frame toward an expanded configuration when the spring element is in the bent state.

Each spring element may be configured to hold the frame in an expanded configuration when the spring element is in the open position.

The spring element may include a metal tape spring.

The metal tape spring may include a bi-convex tape spring assembly.

The spring element may include a flat plate spring.

The spring element may include a torsion spring.

The spring element may include an I-beam structure.

The spring element may include a resilient material.

The resilient material may be composed of one of a polymer and a rubber material.

The spring element may include a self-locking geometry in the open state.

The air filter assembly may have a folded configuration in which corners thereof are not stacked.

Edges of the frame may be secured together at corners.

Each edge of the frame may include an edge cover.

The edge covers may be configured to seal ends of pleats of the filter element.

In at least one embodiment, a compressible air filter assembly for a heating and ventilation air conditioner (HVAC) system includes a filter element that includes a filter medium. The filter medium has rounded pleats and is configured to collapse and rebound in a controlled and repeatable manner between a compressed state and an original uncompressed state. The filter element is secured within an airflow of the HVAC system.

In the compressed state, the pleats may partially overlap each other.

The rounded pleats return to an original shape when transitioned from the compressed state to the original uncompressed state.

The filter element further includes a mesh along at least one face of the filter medium.

The mesh is configured to have a tensile and bending stiffness such that the pleats are encouraged to rebound to an original shape when transitioned from the compressed state to the original uncompressed state.

The filter element further includes a flat filter media layer along at least one face of the filter medium.

The rounded pleats of the filter medium may have rounded crests.

In at least one embodiment, a soft-wrapped filter assembly includes: a frame in a box configuration, the frame including rigid edges and openings to permit airflow in use in an HVAC system; a filter element encased by the frame; and flexible edge covers each mounted on a respective edge of the frame. In use in an HVAC system, the edge covers conform and provide an interference fit to provide an air seal.

Each flexible edge cover may be folded to form a channel at least partially covering the respective frame edge.

The filter element may include a filter medium having rounded pleats.

The filter element may include a mesh along at least one face of the filter medium.

The frame may be constructed of cardboard.

The above and other embodiments may be further described in the following descriptions. For example, the subject matter described herein includes a collapsible air filter assembly for a heating and ventilation air conditioner (HVAC) system. The filter assembly includes a frame for engaging and supporting a filter element and securing the filter element therein. The frame is positioned within an HVAC return to secure the filter within an airflow of the HVAC system. The frame includes a spring element in at least two adjacent sides of the frame, where the spring element is configured to be moveable between an open state and a bent state.

The subject matter described herein further includes a compressible air filter for a heating and ventilation air conditioner (HVAC) system where the filter element is secured within an airflow of the HVAC system. The filter includes a filter element having an original shape profile including a rounded pleat shape. The filter element is configured to collapse and rebound in a controlled and repeatable manner between a compressed shape profile and the original shape profile.

When the compressible air filter and the collapsible air filter frame are combined, the subject matter described herein also includes a collapsible air filter assembly for a HVAC system according to at least one embodiment includes a filter element and a frame for engaging and supporting the filter element. The frame secures the filter element therein and the frame is positioned within an HVAC return to secure the filter within an airflow of the HVAC system. The filter element includes a rounded pleat shape configured to collapse and rebound in a controlled and repeatable manner. The frame includes a spring element that is configured to be moveable between an open state and a bent state. The frame structure is in an expanded configuration when the spring element is in the open position. The frame structure is in a collapsed configuration when the spring element is in the bent position. The spring element is included in at least two opposite sides of the frame.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
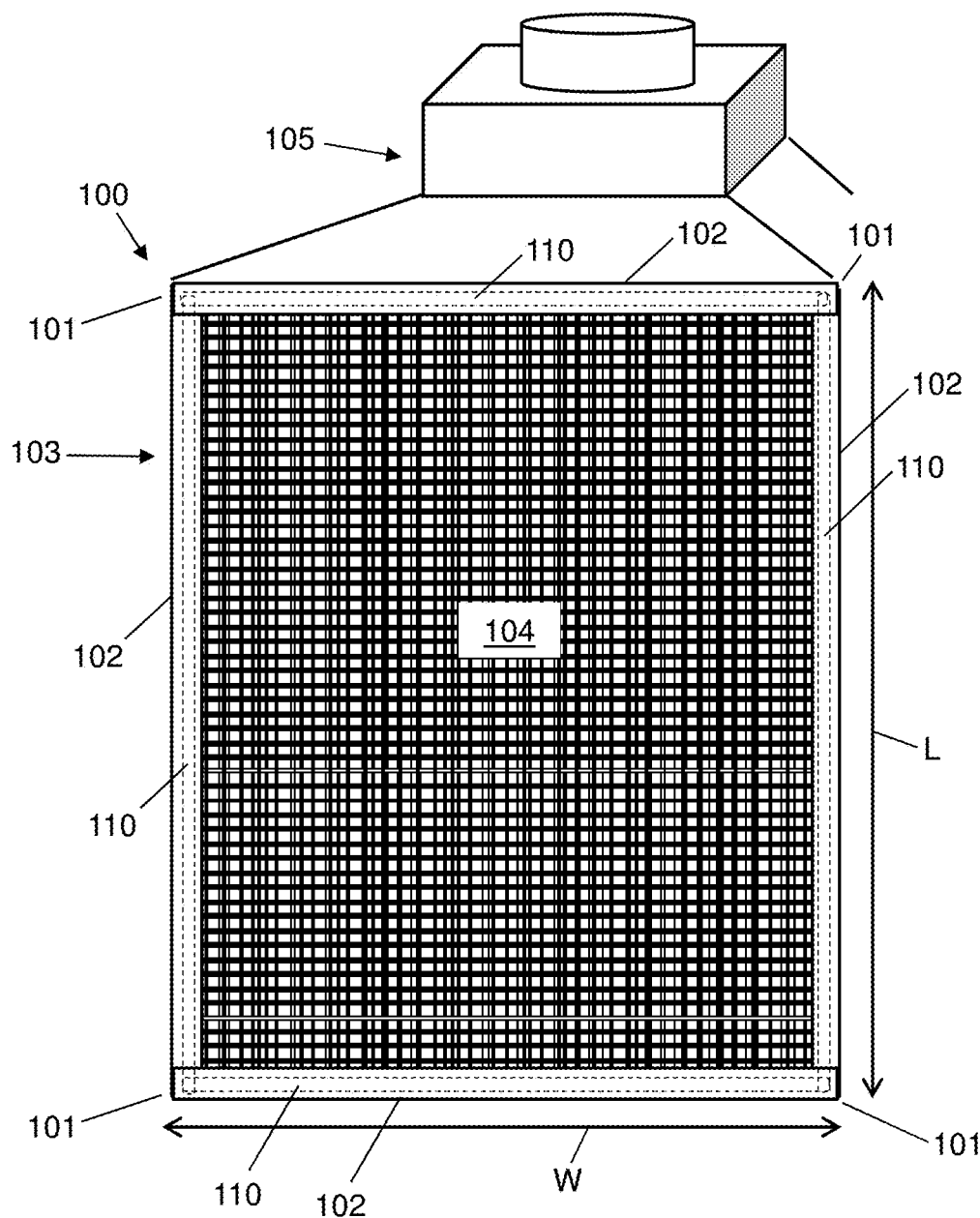
FIG. 1 is a plan view of a collapsible filter assembly, according to at least one embodiment, in an expanded planar state.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

The drawings illustrate various embodiments of filter assemblies and their components including, for example, frames, filter elements supported along their outer edges by frame members, and grates or meshes that span the areas defined between frame elements to further support the filter elements. Each filter element includes at least one filter medium for filtering air passed therethrough. The filter medium is generally porous or air permeable. The filter medium may be layered and may include woven and non-woven fibrous materials such as fabrics, piles, felts, fiberglass, and foams. Filter media according to these descriptions may include materials that are spun bonded, melt blown, carded, or molded. The filter media may include materials having antimicrobial properties. Other filter media materials and properties are within the scope of these descriptions. In some cases, the filter elements include sub-frames and various particular layers and edge treatments. Throughout, some degree of size variability of the frames, filter elements, and other components is enabled by the drawings and descriptions.

The subject matter described herein includes collapsible air filter assemblies for installation and use in, for example, heating and ventilation air conditioner (HVAC) systems. According to various embodiments, a filter assembly 100 includes a filter element and a frame for engaging and supporting the filter element. When an air filter assembly 100 is positioned, for example, within an HVAC system return duct or grate, or within any particular selected airflow area within the system, a frame provides a structure by which the air filter assembly 100 is secured in place, and maintains the filter element in a generally open and planar state for passage of the airflow therethrough.

Figure 11:
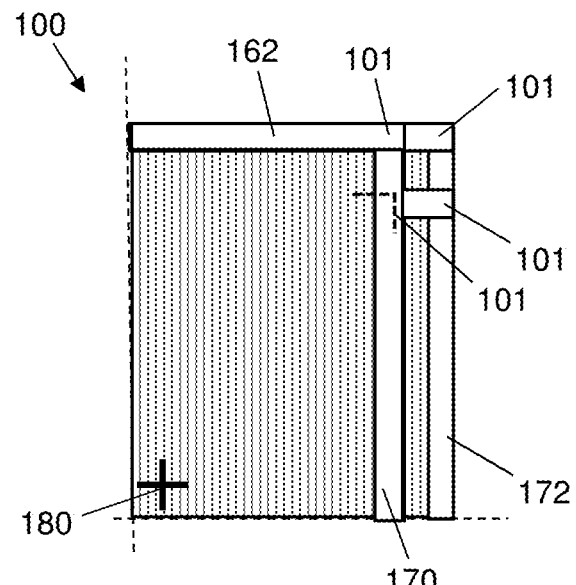
FIG. 11 shows the filter assembly of FIGS. 9 and 10 transitioned to a twice-folded state that avoids stacking the corners.

A filter element may have a filter medium supported by a fibrous mesh or scrim layer. The filter medium herein may have non-creased pleats that extend linearly and longitudinally, by which the filter medium is configured to collapse and rebound in a controlled and repeatable manner. The frame may include a spring element that is configured to be moveable between an open linear state and a bent or folded state. The frame is in an expanded configuration when the spring element is in the open linear state. The frame is in a collapsed configuration when the spring element is in a bent or folded non-linear state. A respective spring element may be included in at least two opposite frame members of a frame at side edges or end edges of a filter assembly. Each spring element assists to return the filter assembly to its illustrated planar state once released from packaging or a folded state (FIG. 11).

A collapsible filter assembly 100, according to at least one embodiment, is shown in a planar state ready for use. The descriptions in some instances describe features with reference to a filter plane, referring to a generally planar configuration or geometry of a filter assembly 100 deployed and ready for use as shown in FIG. 1. The terms length and width refer to dimensions of the filter assembly 100, referenced respectively as a longitudinally extending length L and a laterally extending width W in FIG. 1, are taken as in or parallel to the filter plane and perpendicular to each other. The term depth generally refers to a third dimension referenced for example in FIGS. 2-3 as D, is taken perpendicular to the filter plane through the filter assembly 100 from one face to the opposite face. In the illustrated embodiment, the length L of the rectangular filter assembly 100 is illustrated expressly as greater than the width W (L>W). These descriptions and the referenced drawings refer nonetheless to embodiments in which filter assemblies are square (L=W) in the filter plane, and other rectangular embodiments in which the width W is greater than the length L (W>L). In embodiments in which the filter medium has linear non-creased pleats that extend parallel to a linear edge of the filter assembly 100, that edge is nominally treated herein as having the length L dimension.

An air filter frame may be constructed with four frame members 102 as represented in FIG. 1, each illustrated along a respective edge of the filter assembly. At least two of the frame members 102 may include spring elements 110 in order to transition the air filter frame from a flat state to a bent or folded state. In other configurations, each of the four frame members may include a respective spring element such that the air filter frame can be folded along, for example, two axes.

It may be appreciated that the frame member, and in some embodiments, the spring element may be the same. However, the air filter frame may also contain rigid portions on either side of a smaller spring element. In this configuration, the frame may still be folded by bending the spring element. The difference is that the frame can only be bent where the spring element is located rather than anywhere along its length as would be the case where the frame member and the spring element are the same.

Particularly describing the non-limiting example of FIG. 1, the collapsible filter assembly 100 is shown in a planar state ready for use. The collapsible filter assembly 100 shown has a frame 103 including four frame members 102, in a rectangular configuration, surrounding and supporting a filter element 104 by attachment of four outer edges of the filter element 104 to respective corresponding frame members 102. The frame 103 in use is positioned within an HVAC return to secure the filter element within an airflow of the HVAC system, referenced as system 105 in FIG. 1.

Figure 7:
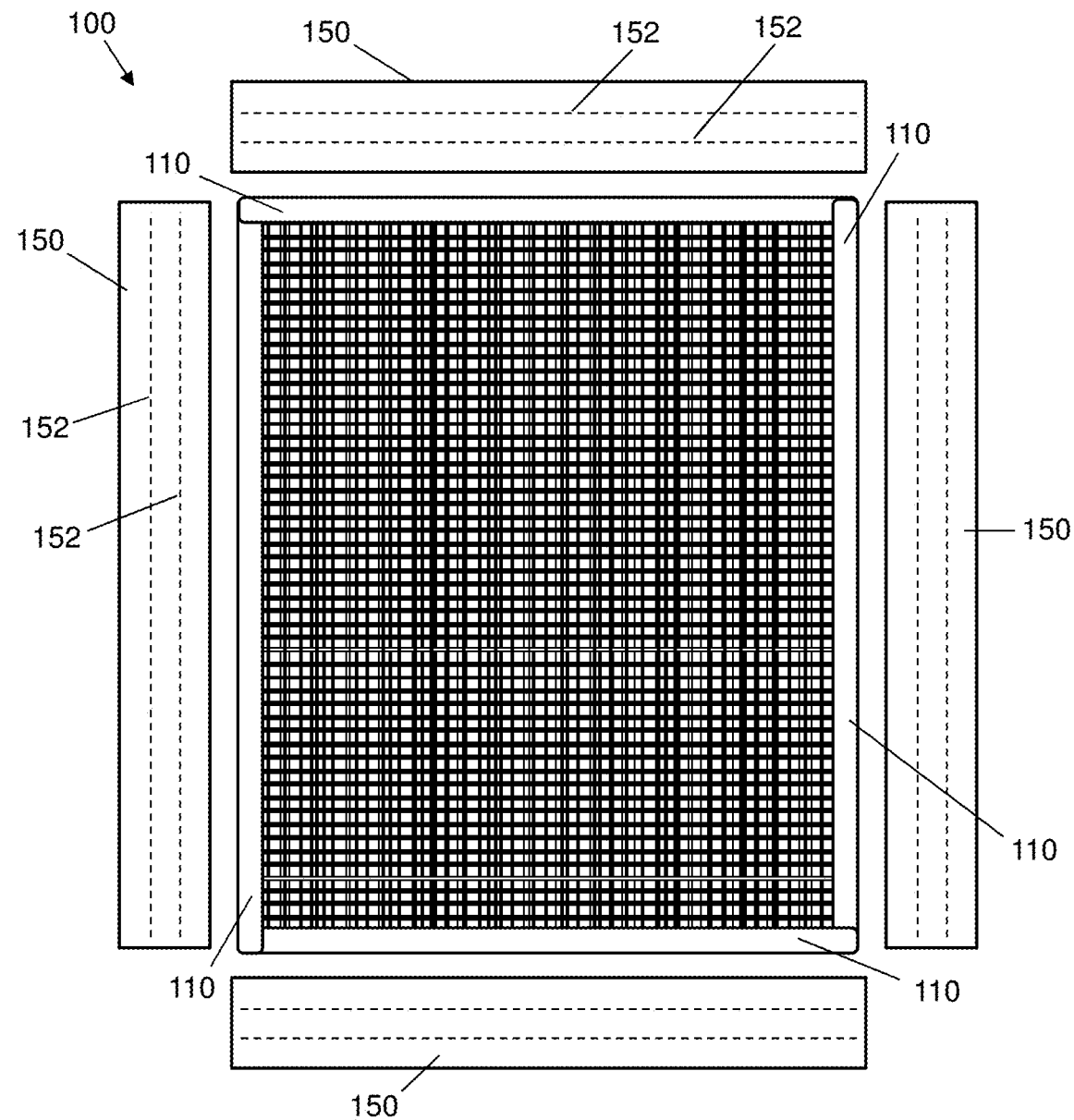
FIG. 7 shows the filter assembly of FIG. 1 in a condition of disassembly for illustration of components thereof.

Each frame member 102 includes a wrapped, internal, or covered respective spring element 110 according to at least one embodiment. The spring elements 110 are shown in FIG. 1 in dashed line for illustration of their approximate disposition in the planar state of the assembled filter assembly 100. For illustration of the components of the filter assembly 100, FIG. 7 shows the filter assembly 100 of FIG. 1 in a condition of disassembly.

Figure 2:
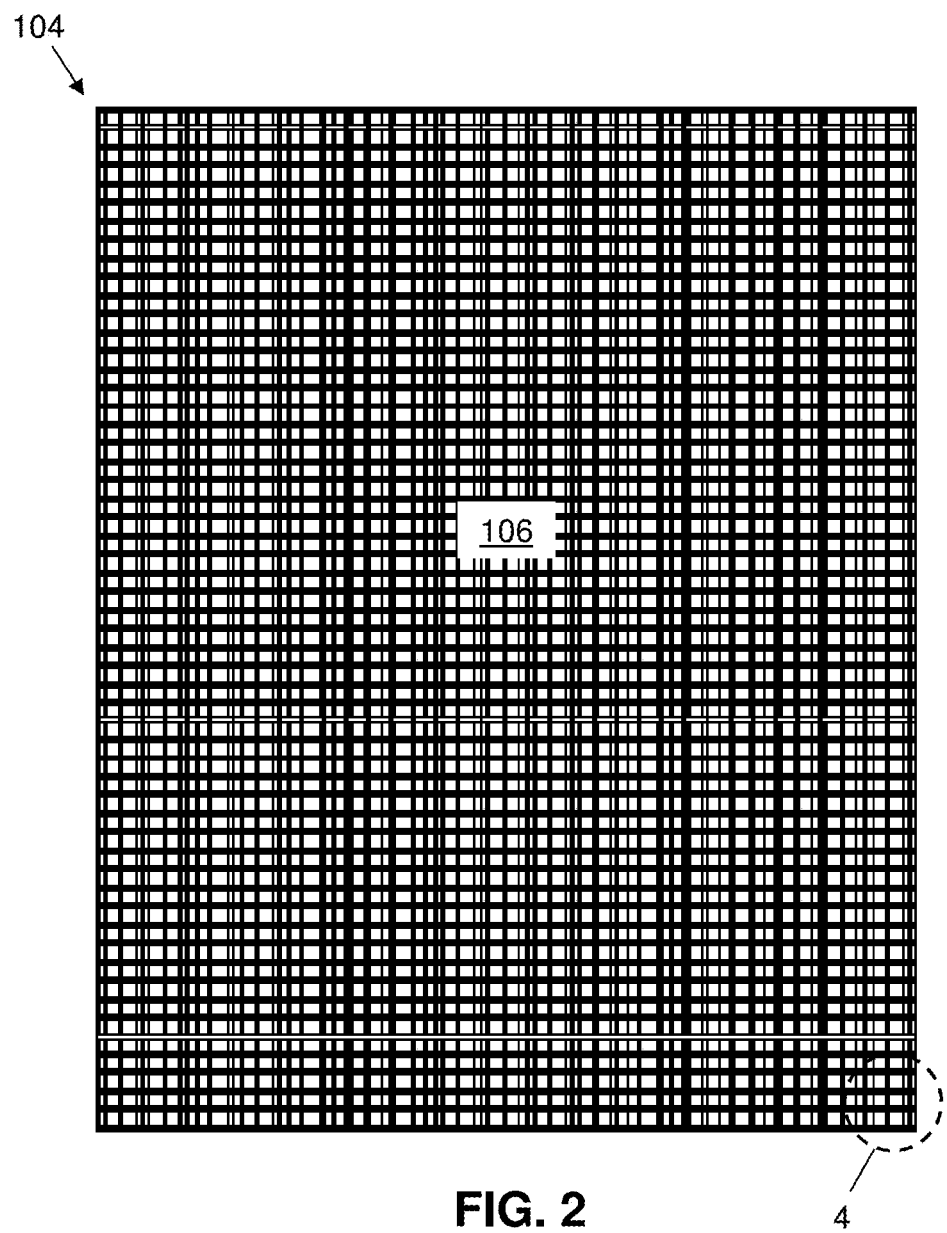
FIG. 2 is a plan view of the filter element of the filter assembly of FIG. 1.

FIG. 2 is a plan view of the filter element 104 of FIG. 1, without the frame members 102. A first face 106 of the filter element 104 is shown, and the opposite second face 108 (FIG. 3) is approximately the same, symmetric, or similar thereto. In use in an HVAC system or other airflow, the first face 106, for example, may be an upstream or intake side, and the second face 108 may be a downstream or output side. In some embodiments, a particular direction of flow may be intended, such that the faces 106 and 108 are designated as the front and back of the filter assembly. In other embodiments, no particular direction of flow may be intended, such that such designation are nominal only.

Figure 3:
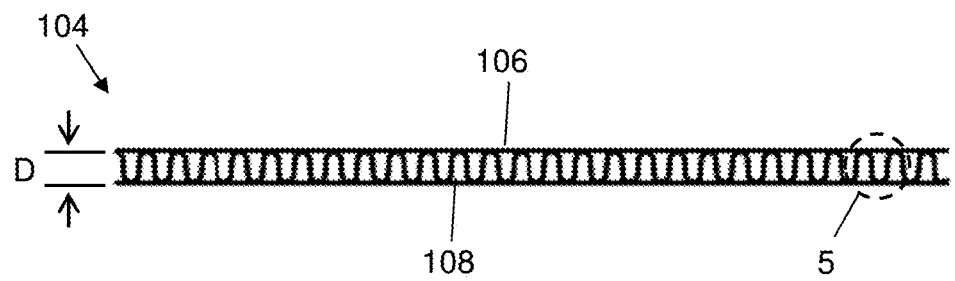
FIG. 3 is an end view of the filter element of FIG. 2, showing U-shaped rounded crests of the filter media.
Figure 4:
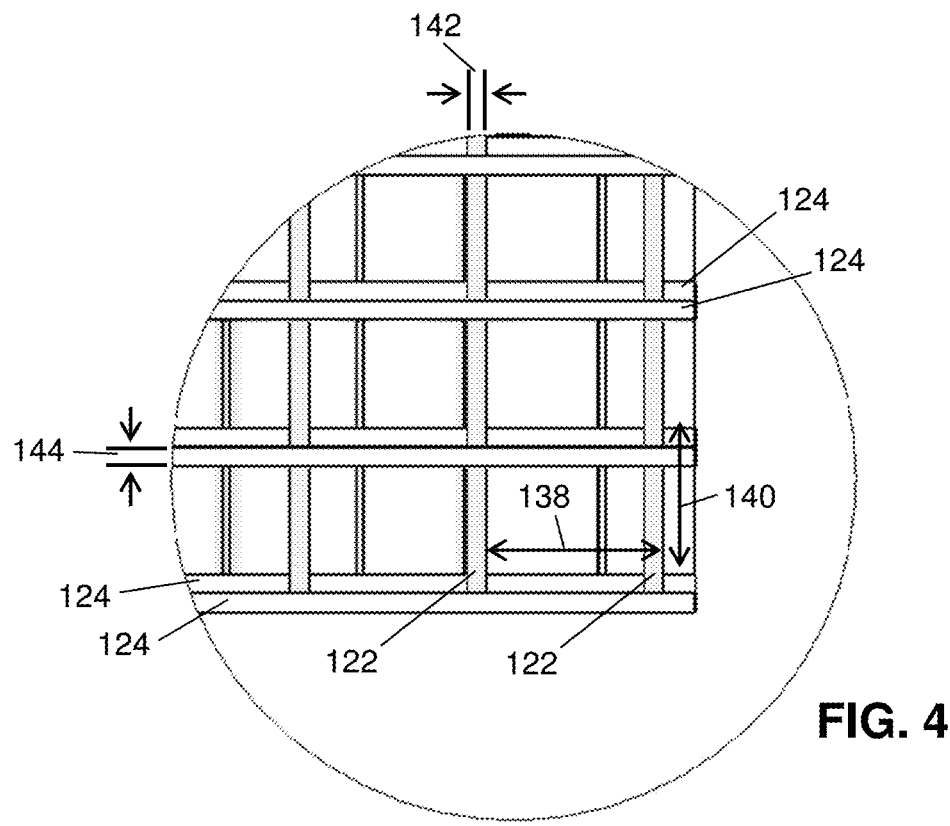
FIG. 4 is an enlarged plan view of a portion of the filter element as marked in FIG. 2.
Figure 5:
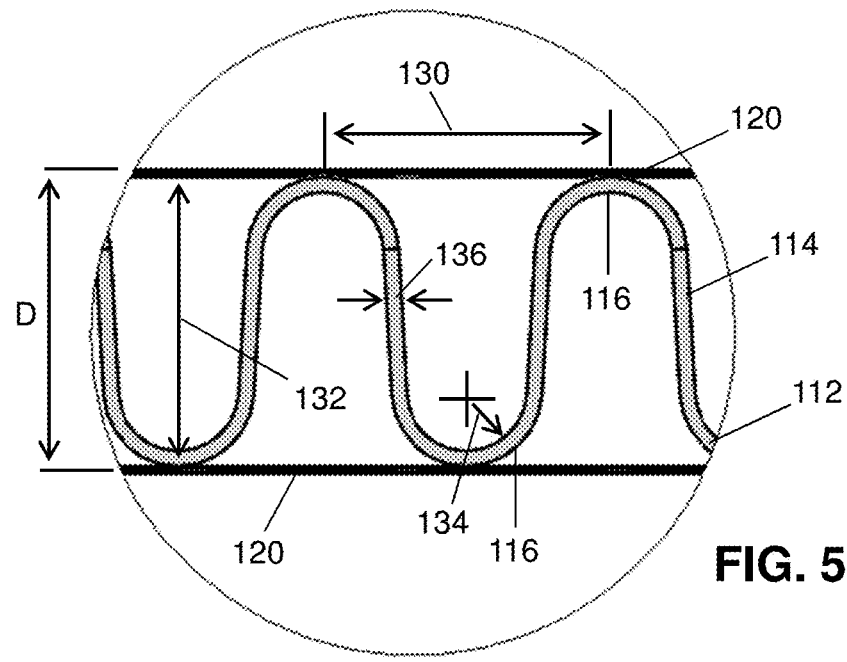
FIG. 5 is an enlarged end view of a portion of the filter element as marked in FIG. 3.
Figure 6:
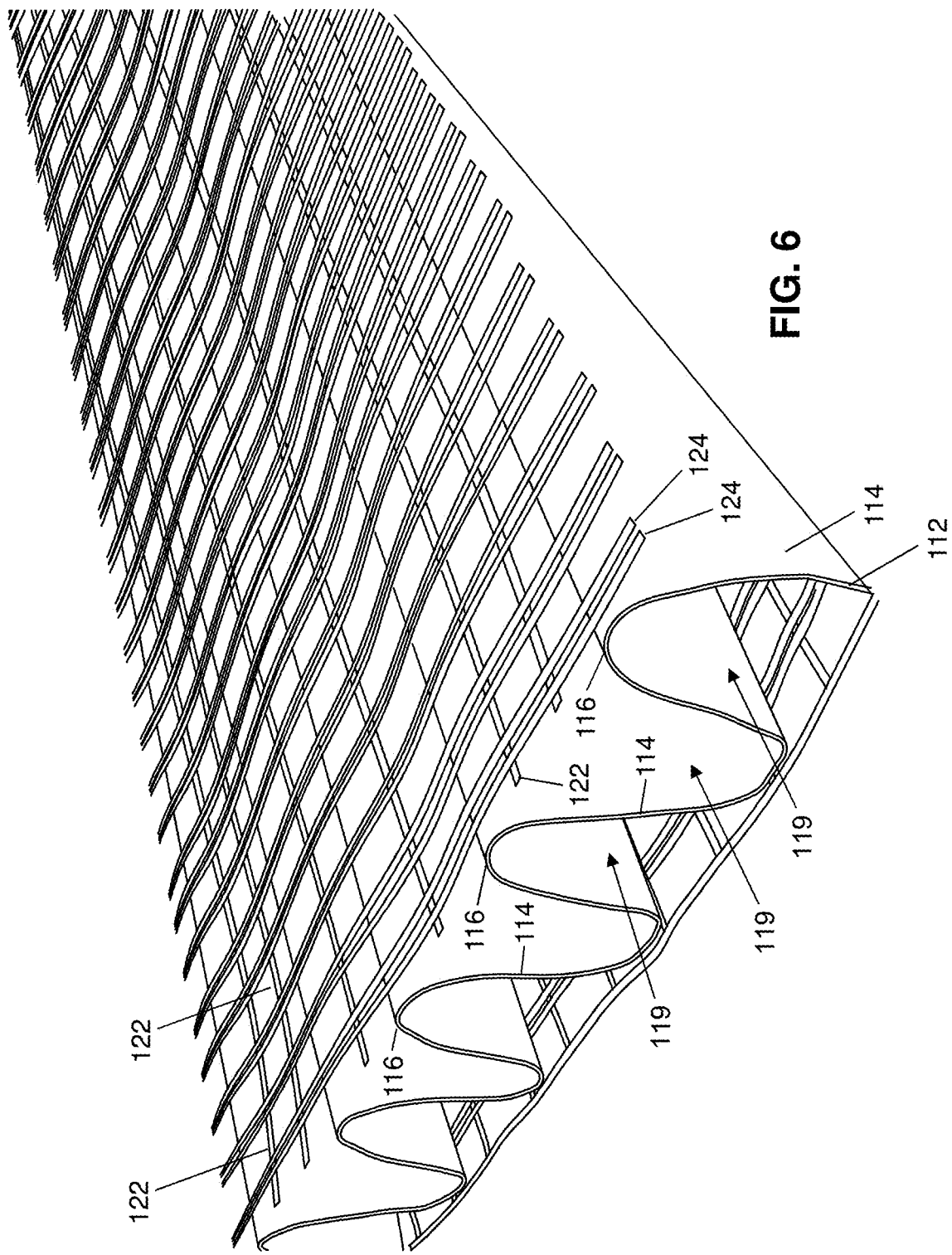
FIG. 6 is an enlarged perspective view of a portion of the filter element of FIG. 2, showing the fibrous mesh.

FIG. 3 is an end view of the filter element 104 of FIG. 2, taken along the longitudinal length and showing the profile thereof. FIG. 4 is an enlarged plan view of a portion of the filter element 104 as marked in FIG. 2. FIG. 5 is an enlarged end view of a portion 5 of the filter element 104 as marked in FIG. 3. FIG. 6 is an enlarged perspective view of a portion 6 of the filter element 104 of FIG. 2. The filter element 104 includes a filter medium 112, which in the illustrated embodiment has rounded (e.g., non-creased) pleats 114, having longitudinally extending U-shaped rounded crests 116 between which longitudinally extending channels 119 (FIG. 6) are defined. The pleats 114 together define an undulating or rounded parallel wave form of the filter medium 112 viewed along the longitudinal dimension (FIG. 5). The filter medium 112 is illustrated in the expanded or relaxed generally planar configuration in FIGS. 2-6. The filter medium 112 advantageously returns to the expanded configuration when released from packaging of folding as described in the following.

In the illustrated embodiment, the filter element 104 includes a respective fibrous mesh 120 along each face serving as supportive scrim layers. As shown in FIGS. 4 and 6, and referring both the mesh 120 along the first face 106 (FIG. 3) of the filter element 104, and the mesh 120 along the second face 108 thereof, the mesh 120 includes longitudinally extending fibers 122 and laterally extending fibers 124 defining a rectangular grid. The fibers 122 and 124 may be made of polyester as a non-limiting example. Each mesh 120 may be somewhat stiff, and is secured to the corresponding face of the filter medium 112 along the crests 116. The tensile and bending stiffness of the mesh 120 assists the pleats 114 to rebound back to their expanded configuration when released from a folded configuration, compression, or packaging.

For example, a higher stiffness mesh 120 may be beneficial for pleat rebound. A stiff mesh may also provide additional sturdiness to the filter assembly 100 and reduce deflection of the filter assembly 100 when under load from airflow when in use. In other embodiments, strips or supports could be reinforced and connected to the frame as an alternative to the meshes described above. In the illustrated embodiment as shown in FIGS. 4 and 6, the laterally extending fibers 124 extend in pairs, whereas the longitudinally extending fibers 122 extend singly. FIG. 4 particularly illustrates that the fibers 124 of each pair are disposed on opposite sides (over and under) of any particular intersecting longitudinally extending fiber 122.

The filter medium having non-creased pleats 114 and supported by the meshes 120 is advantageous over traditional air filters having creased pleat shapes, which are typically triangular. Conventional triangular pleat shapes are stable, strong, and resistant to collapsing but, when collapsed, suffer from a lack of controlled and repeatable collapse and rebound to their original shape. Rounding the pleat shape profile, as in the pleats 114, promotes collapse in a controlled and repeatable manner.

The dimensions provided below are provided as non-limiting examples, and refer to the expanded configuration of the filter medium. These dimensions are advantageous in providing return of the filter element 104, and filter assembly 100 (FIG. 1), to the expanded configuration once released.

Advantageous non-limiting examples of dimensions as referenced in FIG. 4:

Pleat pitch 130 taken from adjacent same-face crests: 19.05 mm (0.75 inch)
Pleat depth 132 (uncompressed): 19.05 mm (0.75 inch)
Crest radius 134 taken from the channel center: 0.157 inch
Filter medium thickness 136: 1 mm+/−0.1 (0.039 inch+/− 0.004)
Lateral spacing 138 fibers 122: 14 mm (0.551 inch)
Longitudinal spacing 140 of corresponding fibers 124: 11.50 mm (0.453 inch)
Thickness 142 of longitudinally extending fibers 122: 1.5 mm (0.059 inch)
Thickness 144 of laterally extending fibers 124: 1.5 mm (0.059 inch)

FIG. 7 shows the filter assembly 100 of FIG. 1 in a condition of disassembly for illustration of components thereof. A respective spring element 110 is disposed or mounted on each outer edge of the filter element 104. A respective frame edge cover 150 is shown in a flat state along each of the four outer edges of the filter element 104. Dashed lines 152 (FIG. 7) along each frame edge cover 150 represent positions of folds in each in its assembled state (FIG. 1). The lines 152 may further represent engineered fold lines defined, for example, by creases, scoring, embossing, or perforations.

Figure 8:
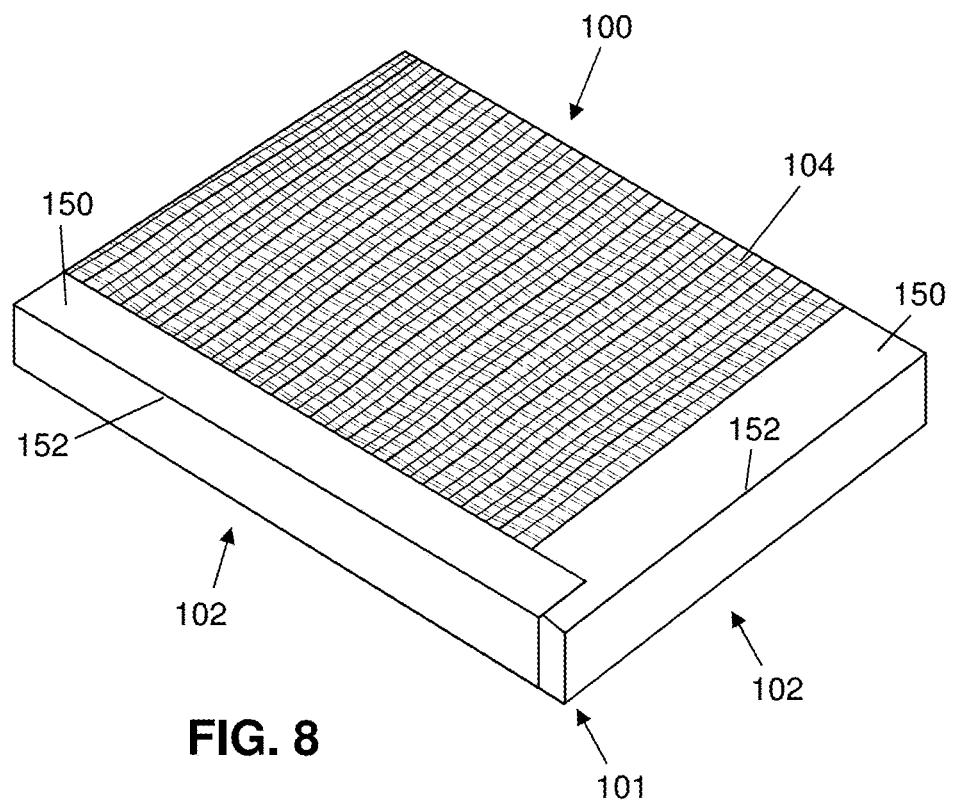
FIG. 8 is a perspective view of a corner of the assembled filter assembly of FIG. 1 for illustration of the folding of the frame edge covers.

A corner of the assembled filter assembly 100 of FIG. 1 is shown in FIG. 8 for illustration of the folding of the frame edge covers 150 to form C-channel shapes by ninety degree bends or folds along each of the lines 152 (FIG. 7), thereby configuring the edge covers to seal ends of the pleats of the filter element. In the assembled filter assembly 100, each frame edge cover 150 is folded to cover a respective edge of the filter element 104 and encase a respective spring element. The frame edge covers are secured to the filter element 104, for example, by adhesive, stitching, bonding, welding, or fasteners. The frame edge covers 150 are joined at their intersecting ends to form corners 101 of the filter assembly 100. The frame edge covers 150 overlap at the corners, providing attachment points for securing their relative positions and folded C-channel shapes. The overlapping portions may be secured together, for example, by adhesive, stitching, bonding, welding, or fasteners. Along each outer edge of the filter assembly 100, a respective frame member 102 is thus constructed of a respective spring element 110 wrapped or covered by the respective folded frame edge cover 150. In other embodiments, a spring element 110 can be attached to a filter media pack.

Figure 9:
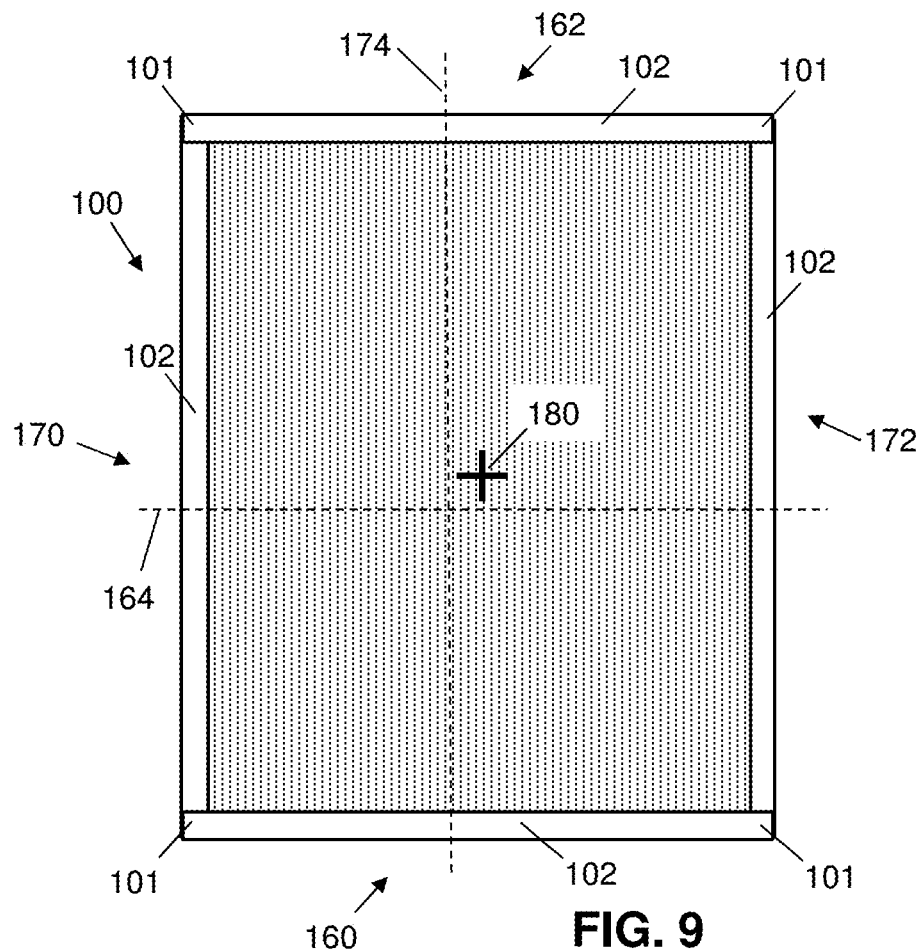
FIG. 9 illustrates the filter assembly of FIG. 1, before folding to transition to once-folded and twice folded states, showing intended fold lines to avoid stacking the corners.
Figure 10:
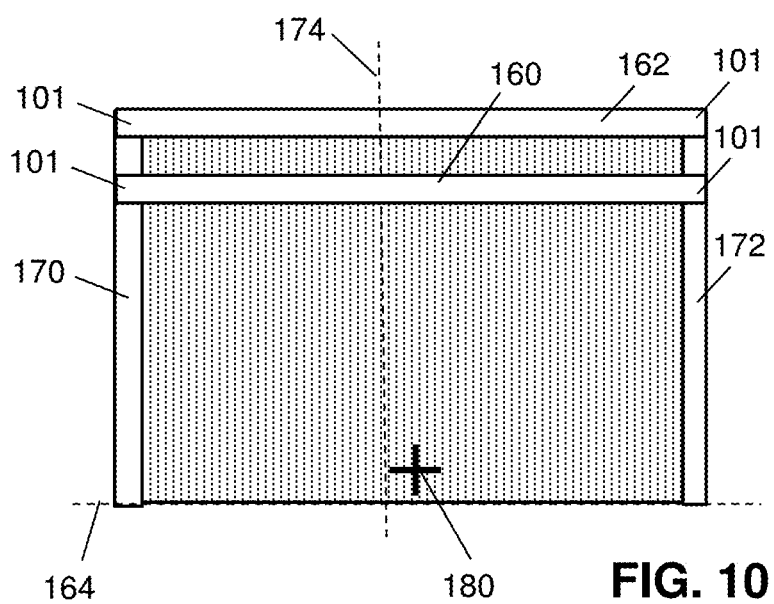
FIG. 10 shows the filter assembly of FIG. 9 transitioned to a once-folded state.

FIGS. 9-11 illustrate a staged folding of the filter assembly 100 of FIG. 1 in such manner as to place the four corners 101 thereof in non-coincident or non-overlapped positions, and thus are not stacked, in the folded state (FIG. 11). Such an arrangement avoids stacking the corners 101 when the filter assembly 100 is, for example, twice-folded. In transitioning from the unfolded planar state (FIG. 9) of the filter assembly 100 to a once-folded state (FIG. 10, a first longitudinal end edge 160 of the filter assembly 100 is repositioned toward an opposite second longitudinal end 162 by folding of the filter assembly 100 at a laterally extending fold line 164. In transitioning from the once-folded state (FIG. 10) of the filter assembly 100 to a twice-folded state (FIG. 11), a first lateral side edge 170 is repositioned toward an opposite second lateral side edge 172 by folding of the filter assembly 100 at a longitudinally extending fold line 174. By selection of the fold lines as displaced from intersecting with the geometric center 180 of the rectangular filter assembly 100 (FIG. 1), stacking of the corners 101 is avoided. The geometric center 180 refers to that of the expanded and generally planar state of the filter assembly 100. This is advantageous toward minimizing the effective or maximum depth of a folded filter assembly 100 (FIG. 11). Stacking the corners 101 would increase the thickness of the air filter assembly 100, with reference to the depth dimension, at the thickest points in a folded configuration.

Folding at either fold line 164, or 174, entails folding the frame members 102 (FIG. 1) intersected by the fold line. That is, folding the filter assembly 100 at the laterally extending fold line 164 includes folding the longitudinally extending frame members that are placed along the lateral side edges 170 and 172. Similarly, folding the filter assembly 100 at the longitudinally extending fold line 174 includes folding the laterally extending frame members that are placed along the longitudinal end edges 160 and 162. The edges 160, 162, 170 and 172, each corresponding to or defined by a respective frame member 102 in FIG. 1, are separately referenced in FIGS. 9-11 for illustration of folding of the filter assembly 100.

In some embodiments, a spring element 110 is included in at least two adjacent frame members 102, referring to any two frame members 102 intersecting at their ends at corners 101 of the filter assembly 100. For example, each frame member 102 at the longitudinal end edges 160 and 162 is adjacent each frame member at the lateral side edges 170 and 172. In some other embodiments, a spring element 110 is included in at least two opposite frame members 102. For example, the frame members 102 at the longitudinal end edges 160 and 162 are opposite each other; and the frame members 102 at the lateral side edges 170 and 172 are opposite each other.

Figure 12A:
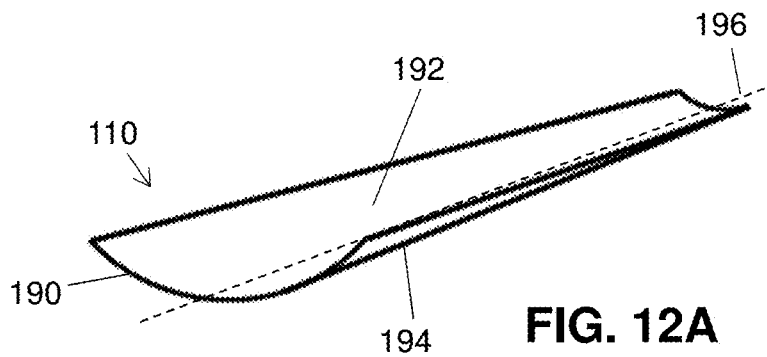
FIG. 12A is a perspective view of an exemplary profiled spring element according to at least one embodiment.

The spring element 110, which returns the filter assembly of FIGS. 1 and 9 to the illustrated planar state once released from packaging or a folded state (FIG. 11), can be of different types in various embodiments. FIG. 12A shows a non-limiting example of the spring element 110, according to at least one embodiment, referenced as a profiled spring member 190. The profiled spring member 190 of FIG. 12A can be constructed of tape spring, which is intrinsically biased toward its linear state. Tape spring material has advantageous bi-stable properties, referring to stability in both folded or rolled states and its linear state. The profiled spring member 190 can be formed of steel in a particular embodiment, and other resilient materials in other embodiments. As shown in FIG. 12A, the profiled spring member 190 has a cylindrical concave (channeled) side 192 and an opposing cylindrically convex side 194. Advantageously, the profiled spring member 190 is self-biased from any flexed or folded state toward its linear state, in which it extends along its longitudinal channel axis 196 defined along its cylindrically concave side 192, and thus provides opening and unfolding forces and self-expanding action in the filter assembly 100 to the planar state of FIG. 1 when released for example from a package or other binding used for shipping and storage in a reduced state. A spring element 110 defined by or including a profiled spring member 190 is advantageous in that return to a linear state is particularly promoted, and thus a filter assembly 100 is more assuredly returned, maintained, or biased into a planar state after folding or during other deformation.

Figure 12B:
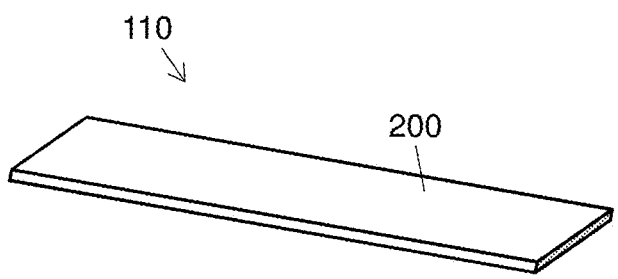
FIG. 12B is a perspective view of a planar spring element according to another embodiment.

FIG. 12B shows a non-limiting example of the spring element 110, according to at least one other embodiment, referenced as a flat plate spring 200 of resilient strip material such as, as non-limiting examples, a polymer, rubber material, or spring steel.

Figure 12C:
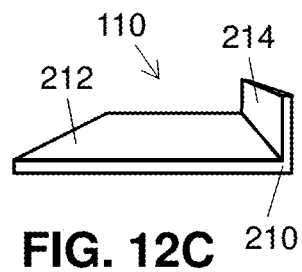
FIG. 12C is a perspective view of an L-channel spring element according to another embodiment.

FIG. 12C shows an alternative spring element 110, according to yet another embodiment, referenced as an L-channel member 210 of resilient material such as, as non-limiting examples, a polymer or rubber material. The L-channel member is defined as two flat planar strips joined at a relative right angle such that one of the two strips is parallel to the filter plane, and the other perpendicular thereto, in a filter assembly 100. In the illustrated example, a first planar strip 212 having a relatively greater first width may be disposed parallel to the filter plane, and the second planar strip 214 having a relative lesser second width would be disposed perpendicular thereto. In yet another embodiment, a spring element includes by an I-beam structure of resilient material such as, as non-limiting examples, a polymer or rubber material. In yet another embodiment, a spring element includes a torsion spring.

The spring elements of FIGS. 12A-12C may be transitioned between a bent state and an open, flat state. In the bent state, the spring element may be curved in at least a portion of its length such that the ends of the spring element point in the same direction. In the flat state, the spring element is straight such that each end faces in opposite directions.

Figure 13:
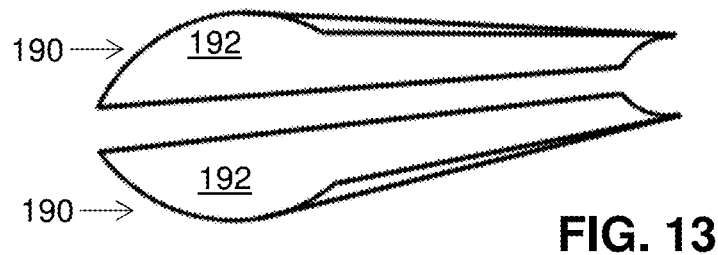
FIG. 13 is a perspective view of two component members of a spring element before assembly, according to at least one embodiment.
Figure 14:
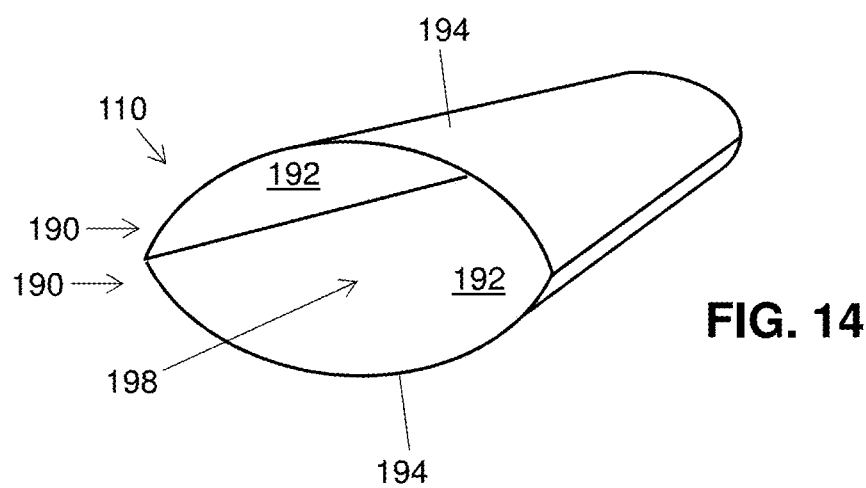
FIG. 14 is a perspective view of the two component spring elements of FIG. 13, joined together to form an assembled spring element, according to at least one embodiment.
Figure 15:
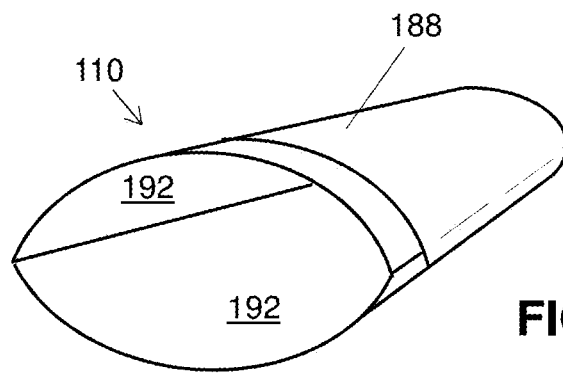
FIG. 15 is a perspective view of the assembled spring element of FIG. 14, with an outer covering, according to at least one embodiment.

In another embodiment as represented in FIGS. 13-15, an assembled spring element 110 includes, as components thereof, two profiled spring members 190 arranged with their cylindrical concave (channeled) sides 192 in facing relationship, defining an internal channel 198 (FIG. 14), and an opposing cylindrically convex sides 194 facing oppositely, defining, as an outer form, a cylinder having an approximately elliptical cross section. The two component spring members 190 may be cut to a desired length and attached together along their edges. FIG. 13 shows the component spring members 190 before they are assembled and secured together. FIG. 14 shows the two component spring members 190 joined together, for example by tape. FIG. 15 shows an outer covering 188, for example of tape, or heat-shrink tubing, maintaining the two component spring members 190 together to define the assembled spring element 110 in the embodiment of FIG. 15.

The assembled spring element 110 of FIGS. 14-15 may have an over-center or lock-out geometry in the open or flat position. This self-locking geometry may provide greater rigidity and stability for the filter frame. In contrast to the over-center or lock-out geometry shown in FIG. 14, a traditional spring may have some undesirable amount of flex and movement, regardless of its position. The assembled spring element 110 of FIGS. 14 and 15 defines a bi-convex configuration when extended as shown, which may be advantageous over a single convex configuration (FIG. 12A) because the bi-convex configuration may lock out in two directions instead of just one direction. It may be appreciated that other polymer or rubber structures may be molded to provide a stable, self-locking configuration as well.

Figure 16:
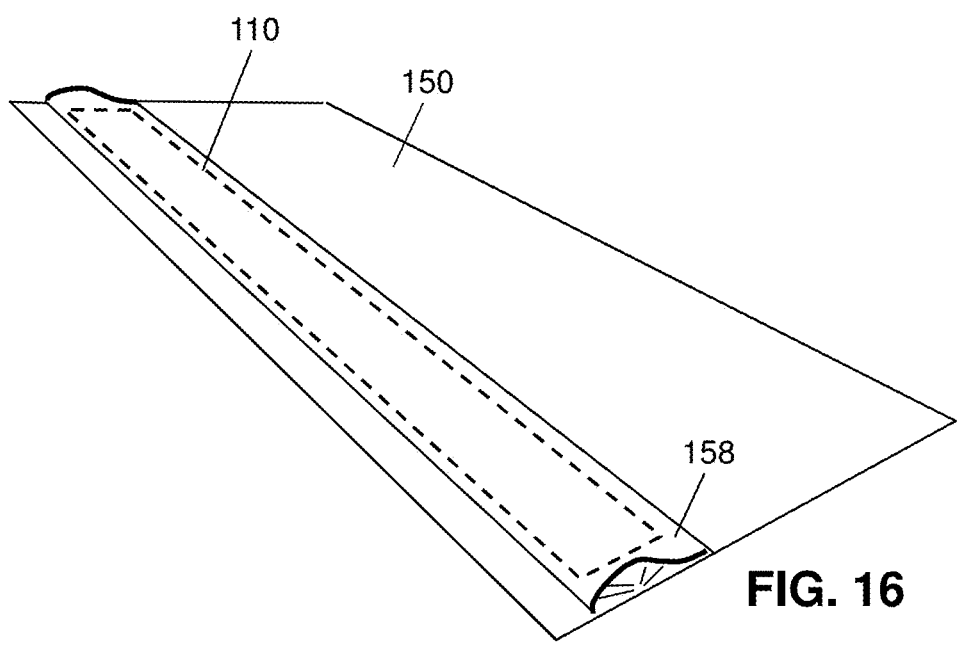
FIG. 16 is a perspective view of a spring element in a pocket of an edge cover according to at least one embodiment.

FIG. 16 shows a spring element 110 wrapped or placed in a pocket 158 of an edge cover 150, according to at least one embodiment. In this embodiment, rather than wrapping the frame edge cover material around a spring element as disclosed, for example, in FIGS. 7-8 and descriptions thereof, a spring element 110 can be wrapped, placed, or otherwise inserted into a pocket 158 in the edge cover material. The frame edge cover 150 can then be folded to cover an edge of the filter element 104 as shown in FIG. 8.

Figure 17A:
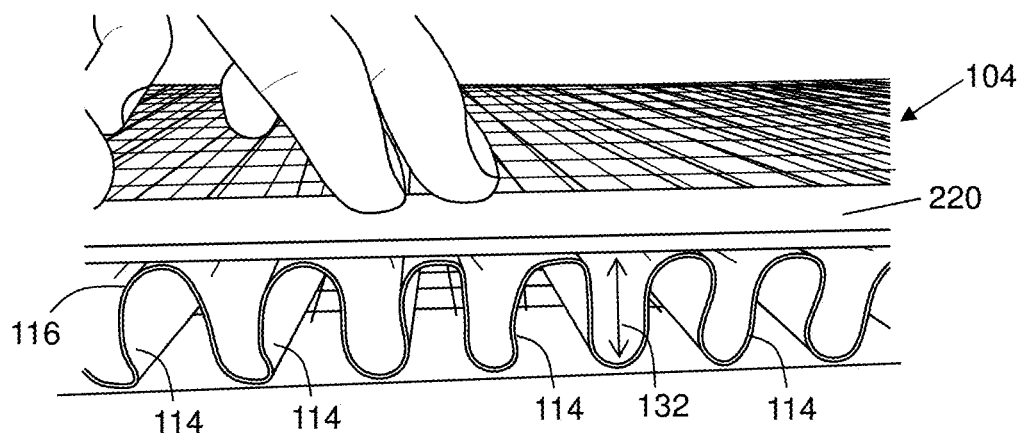
FIG. 17A is a perspective end view of the filter element of FIG. 2 in an uncompressed state.
Figure 17B:
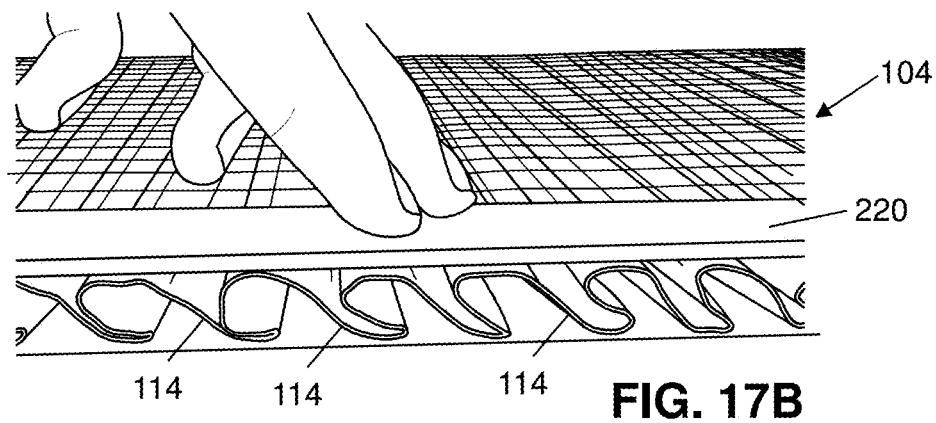
FIG. 17B is a view of the filter element of FIG. 17A under moderate compression.
Figure 17C:
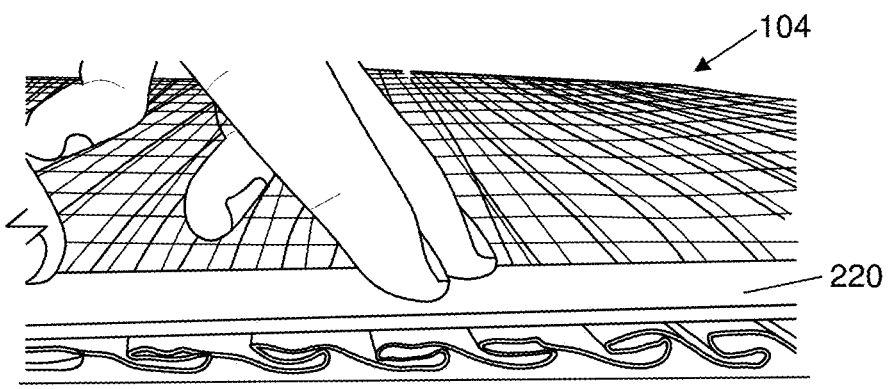
FIG. 17C is a view of the filter element of FIG. 17B under higher compression.

FIGS. 17A-17B shows the filter element 104, for example of FIGS. 2 and 6, in sequence showing the filter element 104 being compressed in the depth dimension. FIG. 17A shows an edge of the filter element 104 under a rigid plate 220 prior to compression. The pleat depth 132 in FIG. 17A thus corresponds to the expanded or released configuration of the filter element 104. For example, the pleat depth 132 in FIG. 17A may be as listed above (19.05 mm). FIG. 17B shows the edge of the filter element 104 under the rigid plate 220 under moderate compression. FIG. 17C shows the edge of the filter element 104 under the rigid plate 220 under higher compression. For example, the depth of the filter element 104 can be reduced, for example, to 0.4 cm under sufficient compressional load (not necessarily represented in FIG. 17C). When the top load, as applied manually in FIGS. 17B-17C through the plate, is no longer applied, the filter element 104 rebounds or returns to its original shape and depth as in FIG. 17A. Thus, the pleat shape of the filter element 104, having rounded (e.g., non-creased) pleats 114 with rounded crests 116, is configured to collapse and rebound in a controlled and repeatable manner, facilitates controlled collapse and rebound of a filter assembly 100, and provides for a compact depth dimension when shipped or stored and is yet easy to return to a flat, open, expanded dimension suitable for installation into an HVAC system.

The original or natural rounded pleat shape of the filter element 104 as defined in the uncompressed state and shown, for example, in FIGS. 2, 6, and 17A, facilitates the pleats 114 tipping over and shingling, partially overlapping each other, when compression is progressively applied as in FIGS. 17B-17C. Further, the particular dimensions provided in the preceding with reference to FIG. 4, such as pleat pitch 130, pleat depth 132, and crest radius 134, provide a favorable aspect ratio and facilitate the rounded pleats 114 to tip over and shingle on top of each other, as shown in transitioning from the uncompressed expanded configuration (FIG. 17A), through the moderately compressed state of FIG. 17B, and to the higher compressed state of (FIG. 17C), and the rebound or return of the filter element 104 to its original shape and thickness as in FIG. 17A in the uncompressed state.

Figure 18A:
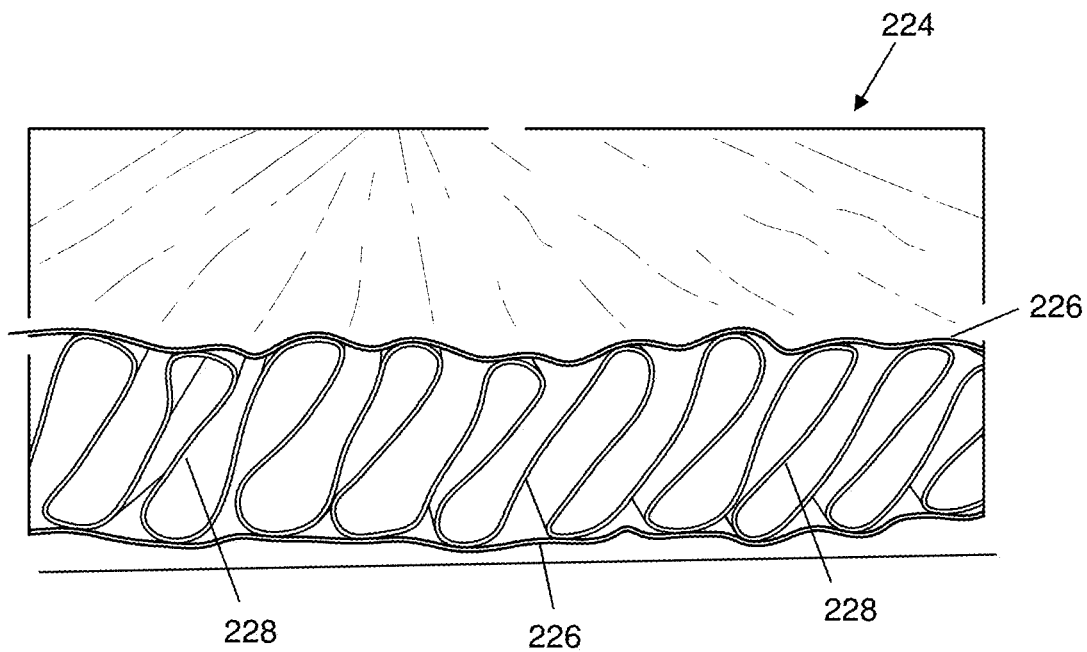
FIG. 18A is a perspective end view showing a profile of a filter element, according to at least one other embodiment, in an uncompressed state.
Figure 18B:
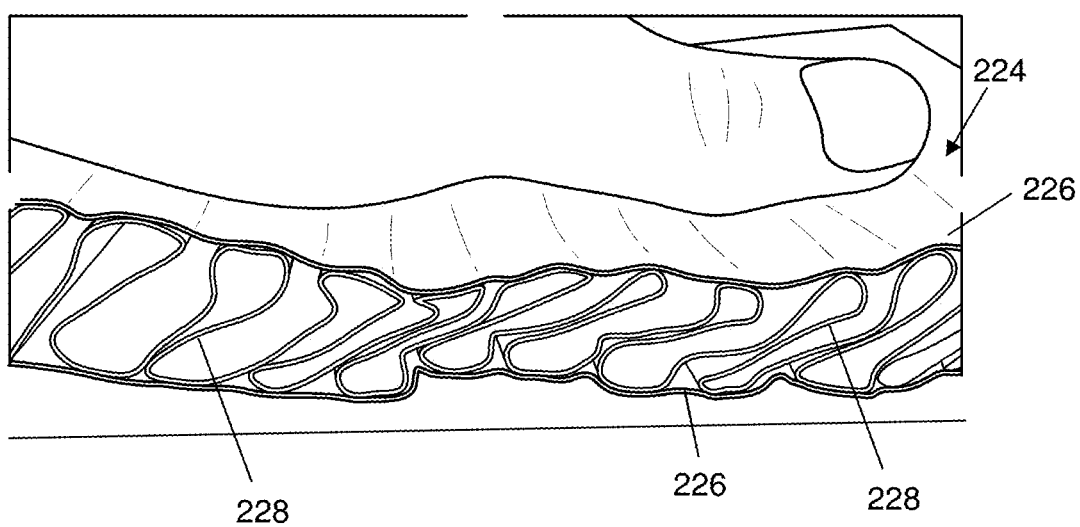
FIG. 18B is a perspective end view of the filter element of FIG. 18A, in a manually compressed state.

FIG. 18A shows a profile view of a filter element 224 having a pleat shape and aspect ratio that encourages collapse according to at least one other embodiment. FIG. 18B shows a profile view of the filter element 224 in FIG. 18A in a compressed state where a top loading causes the pleats 228 to tip over and shingle on top of each other according to at least one embodiment. Referring to FIGS. 18A and 18B, it may be appreciated that the aspect ratio of the pleats, having rounded (e.g., non-creased) pleats with rounded crests, may be configured such that a top loading causes the pleats to tip over and shingle on top of each other. This pleat shape may encourage shearing or tipping over in an overlapping manner. In FIGS. 18A-18B, the filter element 224 includes an additional flat filter media layer 226 along each face thereof, whereas the filter element 104 of FIGS. 2 and 6 includes the fibrous meshes 120 along each face of the filter medium 112.

Figure 19A:
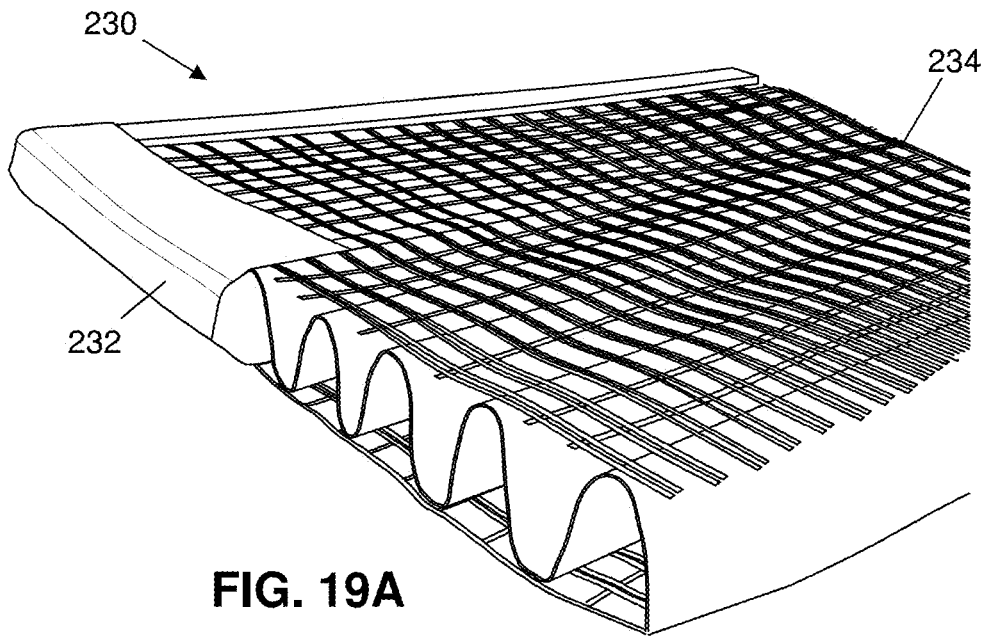
FIG. 19A is a perspective view of a corner portion of an air filter assembly, shown with a portion of an edge cover removed to permit view of the filter medium thereof as having rounded pleats.
Figure 19B:
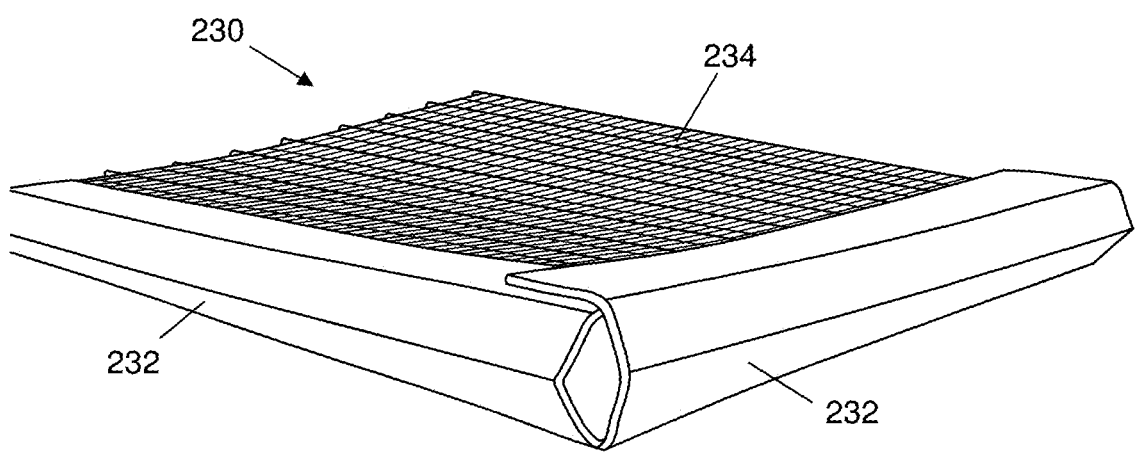
FIG. 19B is a perspective view of a corner portion of the air filter assembly of FIG. 19A showing the edge cover in place.

FIGS. 19A and 19B illustrate an embodiment of a soft-framed air filter assembly 230 in which flexible and compliant edge covers 232 are folded to cover a respective edge of a filter element 234, and may or may not encase a respective spring element. The illustrated filter element 234 may represent the filter element 104 of FIGS. 2-3, or another embodiment. The edge covers 230 are secured to the filter element 234, for example, by adhesive, stitching, bonding, or fasteners. The edge covers 232 are joined at their intersecting ends to form corners of an effective frame of the filter assembly 230. The edge covers overlap at the corners, providing attachment points for securing their relative positions and folded channel shapes. The overlapping portions may be secured together, for example, by adhesive, stitching, bonding, or fasteners. In the illustrated embodiment, the interconnected edge covers 232 together provide a soft frame formed by the joined edge covers, each of which, in cooperation with the filter element 234, returns to the illustrated expanded state when released from compression and/or folding.

In an alternative or addition to the soft-framed filter assembly 230 described above, for example with reference to FIGS. 19A-19B, a soft-wrapped hard-framed filter assembly 250, and components thereof, are shown in FIGS. 20A-20D. In a hard-framed filter assembly, a more rigid material such as a polymer or cardboard may be used for the frame edges. Bendable sections of the frame members may include a flex-joint geometry which allows them to bend and transition between a collapsed, bent, or folded state and an expanded, straight, linear state, for example by including respective spring elements in one or more respective frame members. Expandable or compressible corners may also be used. A soft-wrapped filter assembly has preferable feel to the touch. The pliable flexible soft edge cover material yields and conforms to a host structure, such as a the interior space of an HVAC system, providing an interference fit with the host structure to reduce whistling and noise, and to provide an improved air seal and tighter fit relative to a typical hard-framed filter assembly. Various filter elements can be used. For example, a filter assembly with a cardboard frame can be wrapped in a soft material to become a soft-wrapped hard-framed filter assembly 100.

Figure 20A:
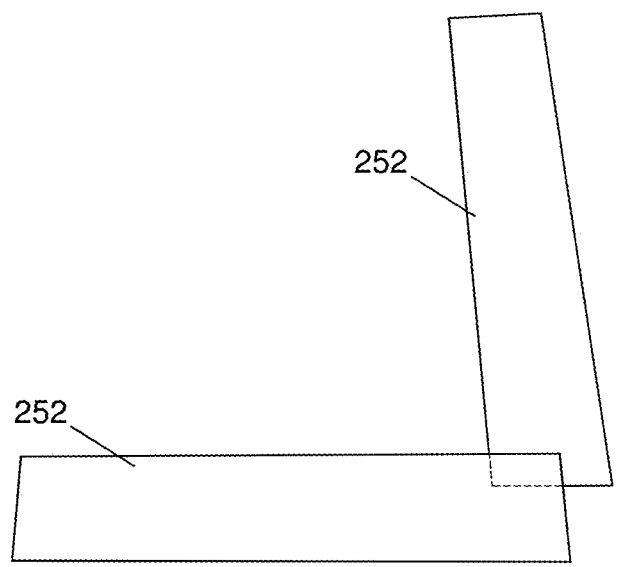
FIG. 20A shows soft edge covers for use in soft-wrapping a filter assembly frame.
Figure 20B:
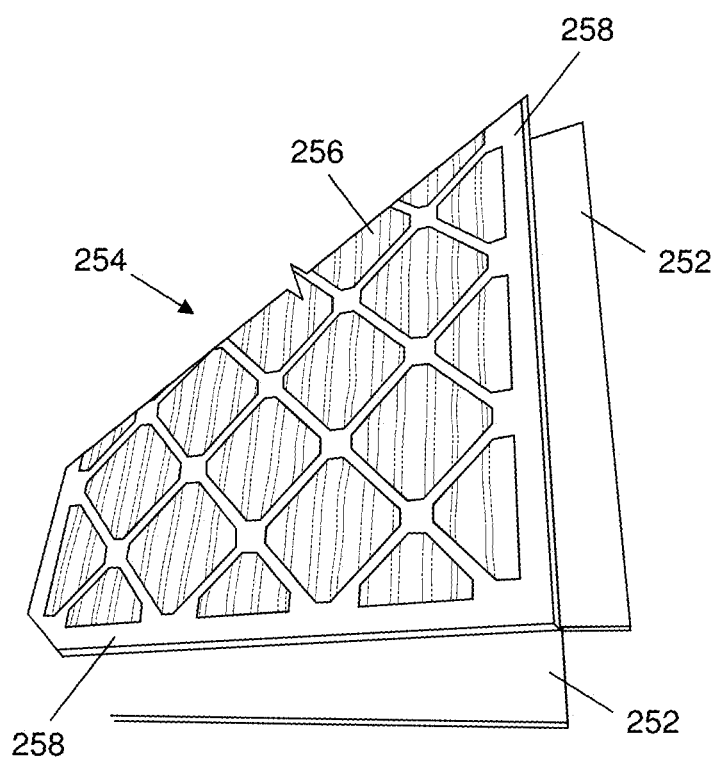
FIG. 20B shows a corner portion of a hard-framed filter assembly, according to at least one embodiment, having edges placed upon the edge covers of FIG. 20A.

FIG. 20A shows soft flexible and compliant edge covers 252 is shown in a flat state. FIG. 20B shows a corner portion of a hard-framed filter assembly 254 having edges placed upon the frame edge covers of FIG. 20A. The filter assembly 254 includes an external frame in a box configuration, having generally rigid edge frame edges 258, and an internal filter element 256 encased by the frame, which has openings to permit airflow in use. For example, the frame may be constructed of cardboard, and may be assembled by folding up sections of one more pre-cut planar components. The filter element 256 may include a filter medium having rounded pleats supported by a fibrous mesh or scrim layer as described above with reference to the filter element 104 of FIG. 2, as a non-limiting example. Other embodiments of the filter element are within the scope of these descriptions.

Figure 20C:
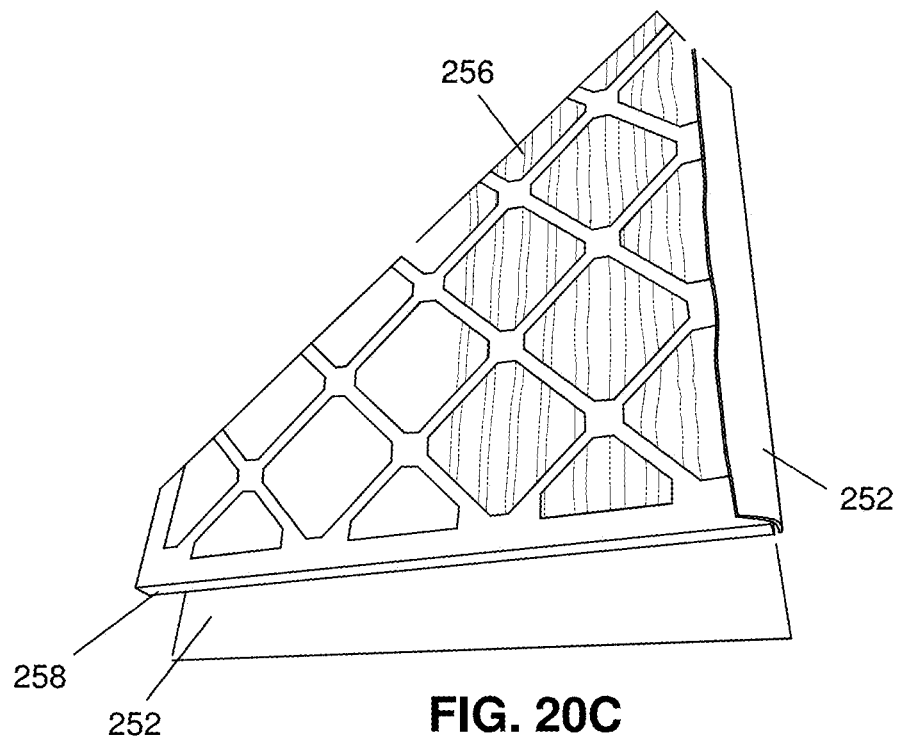
FIG. 20C shows one of the edges of the frame in FIG. 20B wrapped by folding of the respective soft edge cover.
Figure 20D:
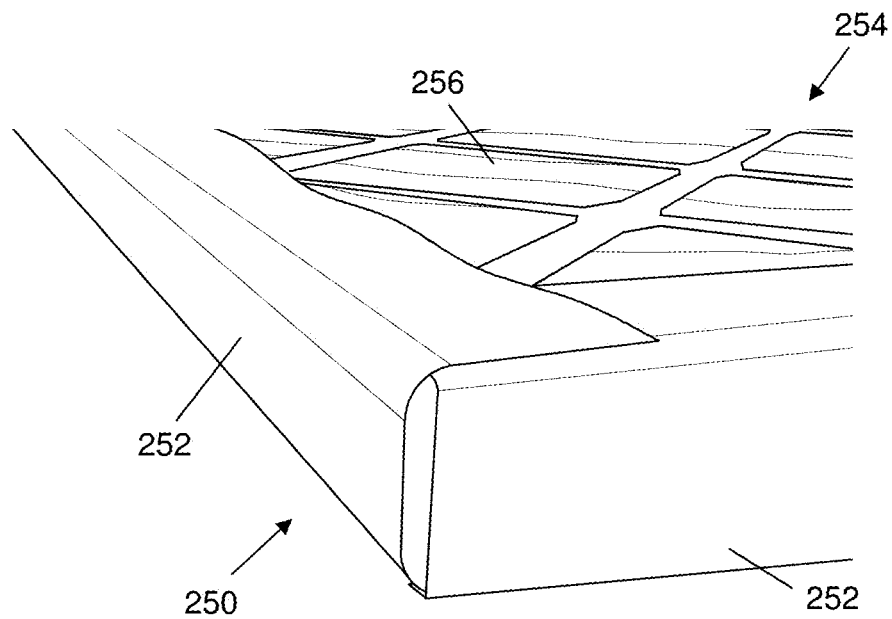
FIG. 20D shows a corner portion of a soft-wrapped hard-framed filter assembly according to at least one embodiment.

In FIG. 20C, one of the two illustrated frame edges 258 of the box-like frame of the filter assembly 254 has a soft flexible edge cover 252 mounted thereon. The edge cover 252 is wrapped by folding of the respective soft edge covers 252 to form a C-channel shape at least partially covering the frame edge. In FIG. 20D, the two illustrated edges of the frame of the filter assembly 254 are wrapped by folding the respective soft edge covers 252. The soft edge covers 252 can be secured to the filter assembly 254, for example, by adhesive, stitching, bonding, or fasteners. The soft edge covers 252 are joined at their intersecting ends to form corners. Two edges of a filter assembly 250 are shown in FIGS. 20B-20C, representing, with particular reference now to FIG. 20D, a soft-wrapped hard-framed filter assembly 250 having a rectangular form with four edges.

The edge covers may be composed of soft textile and may be non-woven, as non-limiting examples. The edge covers may have loft and softness such that when wrapped, even as a single layer, provides some sealing within an HVAC system with interference fit or geometry.

Figure 21:
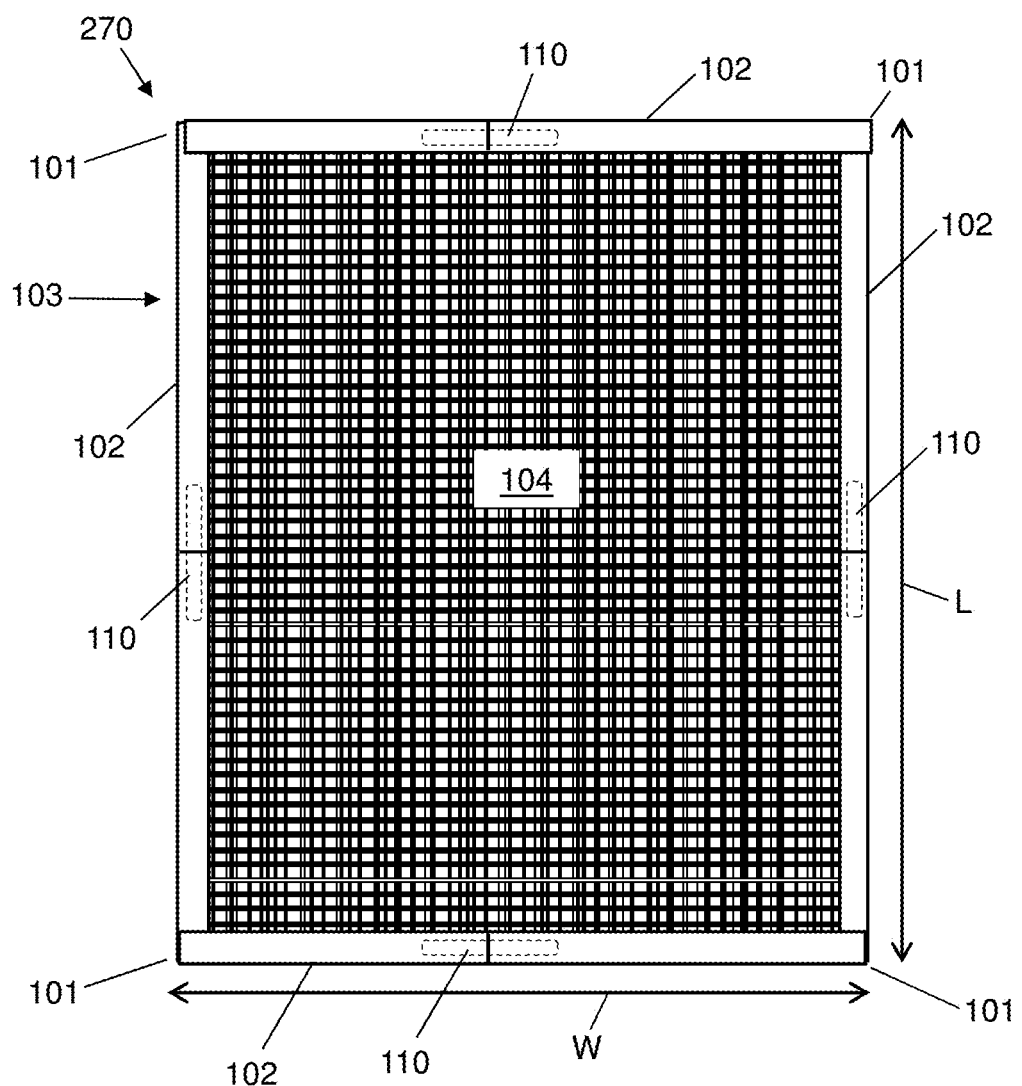
FIG. 21 is a plan view of a collapsible filter assembly, according to at least one other embodiment, in which each frame members has rigid portions on either side of a spring member of shorter length.

FIG. 21 is a plan view of a collapsible filter assembly 270, according to at least one embodiment, in an expanded planar state. The filter assembly 270 bears such similarities to the filter assembly 100-110 that the above descriptions thereof, and the above descriptions of the referenced components, apply as well to the filter assembly 270. A difference is found, however, in that the spring elements 110 in the embodiments of FIG. 1, extend essentially the entire lengths of the respective edges of the frame as defined by the frame members 110. In the embodiment of FIG. 21, each frame members 102 has rigid portions on either side of a spring member 110 of shorter length, such that the spring members do not extend the full lengths of the frame members in the linear expanded or unfolded states. The filter assembly 270 can be once or twice folded, for example as shown in FIGS. 10-11, by bending or folding of the shorter spring members 110 shown in FIG. 21.

Figure 22A:
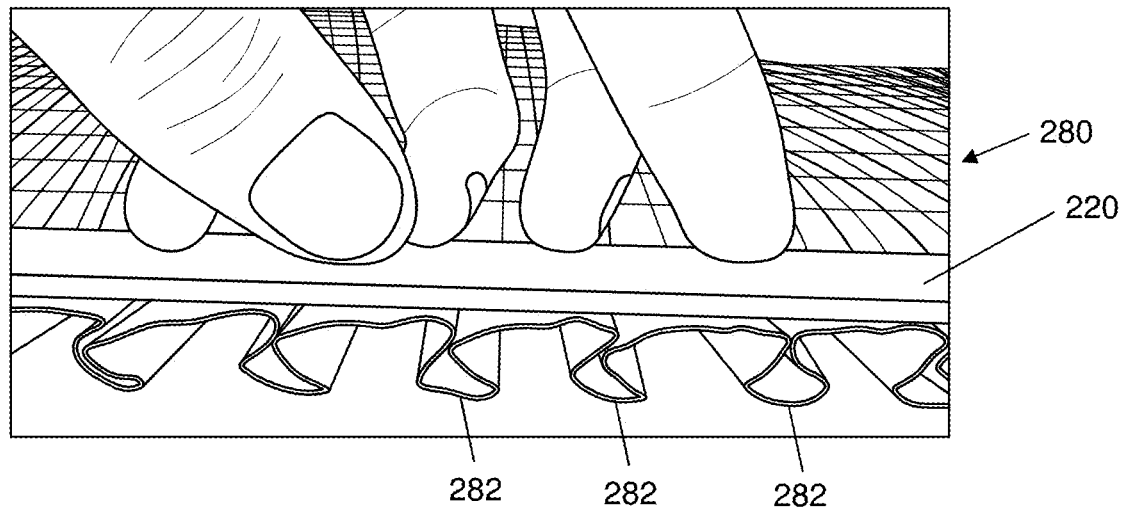
FIG. 22A is a perspective end view showing a profile of a filter element, according to at least one embodiment, in a moderately compressed state.
Figure 22B:
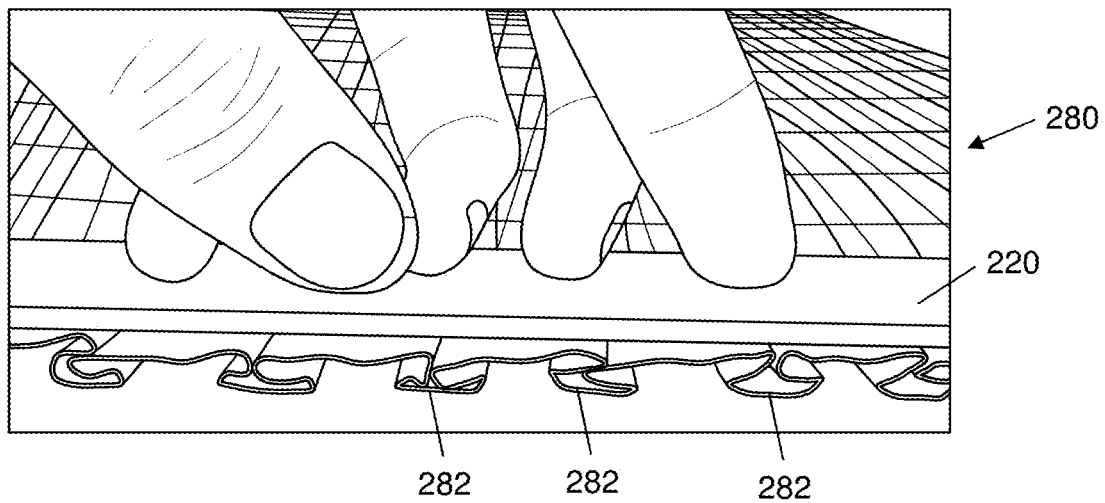
FIG. 22B is a view of the filter element of FIG. 22A under higher compression.

FIG. 22A shows a filter medium 280 in a moderately compressed state; and FIG. 22B shows the filter medium 280 under higher compression. The filter medium 280, in an uncompressed state, has rounded (e.g., non-creased) pleats 282, having longitudinally extending U-shaped rounded crests. The rounded pleat shape is configured to collapse and rebound in a controlled and repeatable manner. Top loading as applied by the rigid plate 220 increases in transitioning form FIG. 22A to FIG. 22B, causing the pleats 282 to compress in the depth dimension, each pleat crushing, and folding or stacking upon itself. This is different than the manner in which the pleats tip over in an overlapping manner in the example of FIGS. 18A-18B. The filter medium 280 is used in the filter element 104 in some embodiments thereof.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A collapsible air filter assembly for a heating and ventilation air conditioner (HVAC) system, the filter assembly comprising:
   a filter element; and
   a frame engaging and supporting the filter element, wherein the frame includes at least two edges, each edge including a respective spring element comprising a bi-convex tape spring assembly having a first profiled spring member, a second profiled spring member, and an internal channel therebetween, wherein the first profiled spring member comprises a concave side facing a concave side of the second profiled spring member,
   wherein each spring element is configured to be moveable between an open state and a bent state, and
   wherein the frame is positioned within an HVAC return to secure the filter element within an airflow of the HVAC system.

2. The air filter assembly of claim 1, wherein each spring element is configured to bias a respective edge of the frame toward an expanded configuration when the spring element is in the bent state.

3. The air filter assembly of claim 1, wherein each spring element is configured to hold the frame in an expanded configuration when the spring element is in the open state.

4. The air filter assembly of claim 1, wherein the first profiled spring member and second profiled spring member are formed from metal.

5. The air filter assembly of claim 1, wherein the spring element includes a resilient material.

6. The air filter assembly of claim 5, wherein the resilient material includes of at least one of a polymer and a rubber material.

7. The air filter assembly of claim 1, wherein the spring element includes a self-locking geometry in the open state.

8. The air filter assembly of claim 1, wherein the air filter assembly has a folded configuration in which corners thereof are not stacked.

9. The air filter assembly of claim 1, wherein edges of the frame are secured together at corners.

10. The air filter assembly of claim 1, wherein each edge of the frame includes an edge cover.

11. The air filter assembly of claim 1, wherein the edge covers are configured to seal ends of pleats of the filter element.

12. The air filter assembly of claim 1, wherein the at least two edges of the frame are adjacent.

13. The air filter assembly of claim 1, wherein the at least two edges of the frame are opposite edges of the frame.

14. The air filter assembly of claim 1, wherein at least one of the spring elements extends essentially a full length of the respective frame edge.

15. The air filter assembly of claim 1, wherein at least one of the spring elements further comprises an outer covering.

16. The air filter assembly of claim 15, wherein the outer covering comprises at least one of tape and heat-shrink tubing.

17. The air filter assembly of claim 1, wherein the internal channel comprises an elliptical cross section between the concave sides of the first profiled spring member and the second profiled spring member.

* * * * *